US010652777B2

(12) United States Patent
Zeng et al.

(10) Patent No.: US 10,652,777 B2
(45) Date of Patent: May 12, 2020

(54) DIRECTIONAL LINK MAINTENANCE METHOD AND STATION STA

(71) Applicant: HUAWEI TECHNOLOGIES CO., LTD., Shenzhen, Guangdong (CN)

(72) Inventors: Kun Zeng, Chengdu (CN); Guangjian Wang, Chengdu (CN); Yingpei Lin, Shanghai (CN); Yan Xin, Ottawa (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 30 days.

(21) Appl. No.: 16/119,324

(22) Filed: Aug. 31, 2018

(65) Prior Publication Data
US 2018/0368020 A1 Dec. 20, 2018

Related U.S. Application Data

(63) Continuation of application No. PCT/CN2017/073095, filed on Feb. 8, 2017.

(30) Foreign Application Priority Data

Mar. 2, 2016 (CN) .......................... 2016 1 0119550

(51) Int. Cl.
*H04W 28/02* (2009.01)
*H04B 7/06* (2006.01)
(Continued)

(52) U.S. Cl.
CPC ...... *H04W 28/0205* (2013.01); *H04B 7/0408* (2013.01); *H04B 7/0617* (2013.01);
(Continued)

(58) Field of Classification Search
CPC .. H04B 7/0408; H04B 7/0617; H04B 7/0695; H04B 7/0851; H04W 16/28; H04W 28/0205; H04W 24/02
See application file for complete search history.

(56) References Cited

U.S. PATENT DOCUMENTS

2002/0146983 A1* 10/2002 Scherzer ............... H04W 16/28
                                                                455/67.11
2010/0214169 A1   8/2010 Kafle
(Continued)

FOREIGN PATENT DOCUMENTS

CN   102334378 A   1/2012
CN   102379152 A   3/2012
(Continued)

OTHER PUBLICATIONS

IEEE Std 802.11ad™-2012 Part 11: Wireless LAN Medium Access Control (MAC) and Physical Layer (PHY) Specifications,Amendment 3: Enhancements for Very High Throughput in the 60 GHz Band,IEEE Computer Society, dated Oct. 19, 2012,total 628 pages.
(Continued)

*Primary Examiner* — Mewale A Ambaye
(74) *Attorney, Agent, or Firm* — Womble Bond Dickinson (US) LLP

(57) ABSTRACT

A directional link maintenance method and a station STA to improve accuracy and timeliness of directional link availability determined by the STA are described. In at least one embodiment, the method includes monitoring, by a first station STA, an information packet, where the information packet carries first identification information, and the first identification information is used to identify a first directional transmit beam that is used a second STA when the second STA sends the information packet; determining, by the first STA, whether the information packet is an information packet that is sent by the second STA to a third STA, and obtaining the first identification information if the information packet is an information packet that is sent by the second STA to the third STA; and determining, by the first STA, whether the first identification information matches preset second identification information.

20 Claims, 6 Drawing Sheets

(51) Int. Cl.
*H04W 24/02* (2009.01)
*H04B 7/0408* (2017.01)
*H04B 7/08* (2006.01)
*H04W 16/28* (2009.01)

(52) U.S. Cl.
CPC ......... *H04B 7/0695* (2013.01); *H04B 7/0851* (2013.01); *H04W 16/28* (2013.01); *H04W 24/02* (2013.01)

(56) References Cited

U.S. PATENT DOCUMENTS

| | | | |
|---|---|---|---|
| 2010/0265924 A1 | 10/2010 | Yong et al. | |
| 2010/0265925 A1 | 10/2010 | Liu et al. | |
| 2011/0305162 A1 | 12/2011 | Morioka | |
| 2012/0020420 A1 | 1/2012 | Sakoda et al. | |
| 2013/0343211 A1* | 12/2013 | Liu | H04L 25/0204 370/252 |
| 2014/0011445 A1 | 1/2014 | Trainin et al. | |
| 2016/0021597 A1* | 1/2016 | Hart | H04W 40/06 370/329 |
| 2018/0248604 A1* | 8/2018 | Zhang | H04W 16/26 |

FOREIGN PATENT DOCUMENTS

| | | |
|---|---|---|
| CN | 102405554 A | 4/2012 |
| CN | 103596195 A | 2/2014 |
| CN | 105119640 A | 12/2015 |
| EP | 2661033 A2 | 11/2013 |

OTHER PUBLICATIONS

2015-TECH-Qualcomm-0208-00-SP Dallas F2F Nov. 2015 SP and Motions Results,total 68 pages.
Intel.,"11ay PPDU format and header definition",IEEE P802.11 Wireless LANs,dated Jul. 30, 2015,total 8 pages.

* cited by examiner

| L-STF | L-CEF | L-Header | EDMG-Header-A | EDMG-STF | EDMG-CEF | EDMG-Header-B | Data | AGC | TRN |

FIG. 4

| Frame Control | Duration/ID | Address 1 | Address 2 | Address 3 | Sequence Control | Address 4 | QoS Control | HT Control | Frame Body | FCS |

FIG. 5

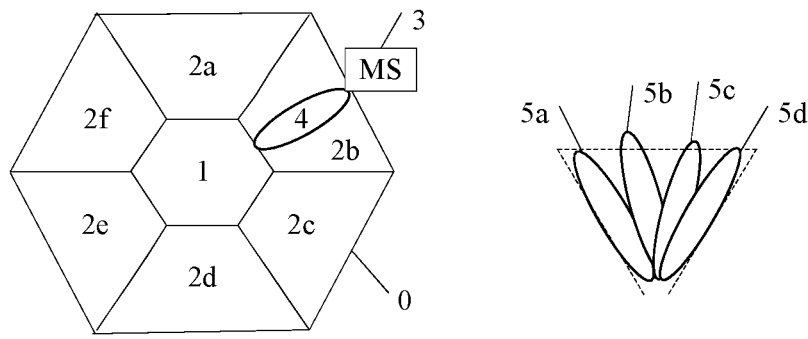

FIG. 6

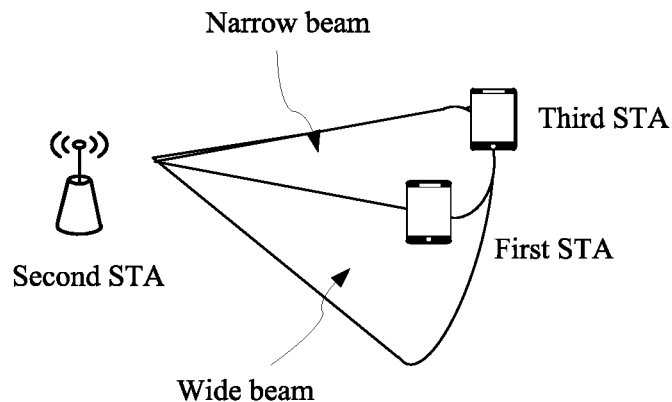

FIG. 7

| A first STA triggers a beam re-training procedure if a value of a counter that corresponds to a directional link progressively decreases to zero or close to zero, or progressively increases to a preset threshold or close to a preset threshold, where the directional link is a directional link between the first STA and a second STA, and the preset threshold is a preset value of the counter for triggering a beam re-training procedure | 301 |

↓

| The first STA monitors an information packet on the directional link | 302 |

↓

| Before an execution time window for the beam re-training arrives, if the first STA monitors and receives the information packet that is sent by the second STA by using the directional link, the first STA changes the value of the counter that corresponds to the directional link, and ends the beam re-training procedure | 303 |

FIG. 8

DIRECTIONAL LINK MAINTENANCE METHOD AND STATION STA

CROSS-REFERENCE TO RELATED APPLICATIONS

This application is a continuation of International Application No. PCT/CN2017/073095, filed on Feb. 8, 2017, which claims priority to Chinese Patent Application 201610119550.4, filed on Mar. 2, 2016. The disclosures of the aforementioned applications are hereby incorporated by reference in their entireties.

TECHNICAL FIELD

The present disclosure relates to the field of communications technologies, and in particular, to a directional link maintenance method and a station STA.

BACKGROUND

With development of mobile Internet and popularization of intelligent terminals, data traffic increases rapidly. With advantages of a high rate and low costs, a wireless local area network (WLAN) has become a mainstream mobile access technology. Compared with low frequency bands on which spectrum resources are becoming increasingly insufficient, for example, 2.4-GHz and 5-GHz frequency bands, a 60-GHz frequency band has abundant spectrum resources and can easily offer a Gbps-level service throughput. For example, an Institute of Electrical and Electronics Engineers (IEEE) 802.11ad system working on the 60-GHz frequency band can reach a peak rate of 6.7 Gbps. Directional transmission is one of typical features of high frequency communication. When radio is transmitted on a high frequency band, a signal path loss is relatively high, and a capability of penetrating an obstacle is relatively poor. In addition, a high frequency signal has a millimeter-level short wavelength. This is suitable for deploying an array antenna based on an existing radio frequency chip size. A station (STA) in the 802.11ad standard is provided with array antennas, and the array antennas communicate with each other by using a directional link that is generated by using a beamforming (BF) technology and suppress a high path loss by using directional beam gains. To obtain directional beam gains, orientations of receive/transmit beams at two ends of a link need to be adjusted to align beams. When beams at the receive end and the transmit end are not aligned, the beams are mismatched, causing a lack of directional beam gains and dramatic deterioration of quality of a received signal, and consequently, the link is interrupted. To maintain beam alignment at two ends of a link, in the 802.11ad standard, a beam training method is provided. When beams at the receive end and the transmit end are not aligned, a beam training process is initiated. In addition, when beams at the receive end and the transmit end are aligned and a directional link is set up, usually, whether beam mismatching occurs is determined based on whether quality of a received signal dramatically deteriorates or whether the link is interrupted. If the beam mismatching occurs temporarily, the mismatching disappears after a short period of time. In this case, there is no need to initiate a beam training process immediately. In view of this, time for initiating beam training becomes a problem that needs to be resolved currently.

Because the 802.11ad standard supports only SISO (Single-Input Single-Output, SISO) between STAs, a pair of STAs may obtain a directional link after a beam training process. In terms of time for initiating beam training, a currently-provided directional link maintenance solution is as follows. The STAs allocate a counter to the directional link and set an initial value, for example, 126 ms. After the counter is assigned the value, the value of the counter decreases as time passes. When the value of the counter is zero or close to zero, the directional link corresponding to the counter reinitiates a beam training process at a transmit end. In addition, in an existing solution, after the pair of STAs successfully exchange information once on the directional link, the value of the counter may be restored to the initial value, and the value of the counter is updated.

In the existing solution, update of the value of the counter depends on the interactive information obtained by the STAs on the directional link. However, when a quantity of STAs is increased, average opportunities for each STA to use the directional link are reduced, affecting update frequency of the value of the corresponding counter and further affecting accuracy and timeliness of directional link availability determined by the STA.

SUMMARY

Embodiments of the invention provide a directional link maintenance method and a station STA, to improve accuracy and timeliness of directional link availability determined by the STA.

In at least some embodiments, a directional link maintenance method is provided. The directional link maintenance method may include:

sending, by a second STA, an information packet to a recipient STA by using a directional transmit beam, where the recipient STA may be a third STA in the following description, or may be another STA;

monitoring, by a first STA, the information packet, where the information packet carries first identification information, and the first identification information is used to identify a first directional transmit beam that is used by the second STA when the second STA sends the information packet;

determining, by the first STA, whether the information packet is an information packet that is sent by the second STA to the third STA, and obtaining the first identification information if the information packet is an information packet that is sent by the second STA to the third STA; and determining, by the first STA, whether the first identification information matches preset second identification information, and if the first identification information matches the preset second identification information, determining, by the first STA, that the first directional transmit beam matches a second directional transmit beam, and changing a value of a counter that corresponds to a directional link between the first STA and the second STA, where the second directional transmit beam is a directional transmit beam determined by the second STA on the directional link through beam training, and the second identification information is used to identify the second directional transmit beam.

Beneficial effect of the method: after the first identification information carried in the information packet is intercepted and detected, whether the directional link between the first STA and the second STA is available is determined by using the first identification information and the preset second identification information. In a condition in which the first identification information matches the second identification information, the directional link is available. In addition, accuracy and timeliness of directional link availability determined by the first STA is improved by changing the value of the counter that corresponds to the directional link.

In at least some embodiments,
the determining, by the first STA, whether the first identification information matches preset second identification information includes:

determining, by the first STA based on the first identification information, whether the first directional transmit beam is a narrow beam, and determining, based on the preset second identification information, whether the second directional transmit beam is a wide beam;

if the first directional transmit beam is a narrow beam and the second directional transmit beam is a wide beam, determining whether coverage of the first directional transmit beam falls within coverage of the second directional transmit beam; and if the coverage of the first directional transmit beam falls within the coverage of the second directional transmit beam, determining, by the first STA, that the first identification information matches the preset second identification information.

Beneficial effect of this implementation: provided that the coverage of the narrow beam falls within the coverage of the wide beam, it is considered in embodiments of the invention that the first identification information matches the second identification information, and it may be further considered that the first directional transmit beam matches the second directional transmit beam.

In at least some embodiments, the first identification information includes: a number of the first directional transmit beam, a number of a codebook that is used to generate the first directional transmit beam, or an explicit information identifier used to generate the first directional transmit beam; and the second identification information includes: a number of the second directional transmit beam, a number of a codebook that is used to generate the second directional transmit beam, or an explicit information identifier used to generate the second directional transmit beam.

Beneficial effect of this implementation: more options are provided by providing the three identification methods.

In at least some embodiments,
the first identification information is carried by using a preamble part and/or a Media Access Control layer MAC header part of the information packet.

Beneficial effect of this implementation: the first identification information is carried by using the preamble part and/or the Media Access Control layer MAC header part of the information packet.

In at least some embodiments,
the first identification information is carried by using the preamble part of the information packet is specifically: the first identification information is carried by using a header of a physical layer data unit in the preamble part of the information packet.

In at least some embodiments, the header of the physical layer data unit includes an EDMG Header-A and an EDMG Header-B, and if a transmission mode between the second STA and the first STA is a single-user transmission mode, the first identification information is carried by using the EDMG Header-A; or if a transmission mode between the second STA and the first STA is a multi-user transmission mode, the first identification information is carried by using the EDMG Header-A and/or the EDMG Header-B.

In at least some embodiments, the first identification information is carried by using the Media Access Control layer MAC header part of the information packet is specifically: the first identification information is carried by using a MAC protocol data unit in the MAC header part of the information packet.

In at least some embodiments, the MAC protocol data unit includes a QoS control field and an HT control field, and the first identification information is indicated by using the QoS control field or the HT control field.

In at least some embodiments, the monitoring, by a first station STA, an information packet includes:
monitoring, by the first STA, the information packet by using a directional receive beam, where the directional receive beam is a directional receive beam determined by the first STA on the directional link through beam training.

In at least some embodiments, before the determining, by the first STA, whether the information packet is an information packet that is sent by the second STA to a third STA, the method includes:
parsing, by the first STA, the header part of the information packet to obtain indication information; and
the determining, by the first STA, whether the information packet is an information packet that is sent by the second STA to a third STA includes:
determining, by the first STA based on the indication information, whether a source address of the information packet is the second STA, and determining whether a destination address of the information packet is the third STA; and
if the source address of the information packet is the second STA and the destination address of the information packet is the third STA, determining, by the first STA, that the information packet is the information packet that is sent by the second STA to the third STA.

In at least some embodiments, the method further includes:
triggering, by the first STA, a beam re-training procedure, if the value of the counter that corresponds to the directional link progressively decreases to zero or close to zero, or progressively increases to a preset threshold or close to a preset threshold, where the preset threshold is a preset value of the counter for triggering a beam re-training procedure;
monitoring, by the first STA, the information packet on the directional link; and
before an execution time window for the beam re-training arrives, if the first STA monitors and receives the information packet that is sent by the second STA by using the directional link, changing, by the first STA, the value of the counter that corresponds to the directional link, and ending the beam re-training procedure.

Beneficial effect of this implementation: based on the foregoing new beam re-training method, unnecessary overheads caused by beam re-training are reduced, and system spectrum utilization is improved.

In at least some embodiments, a station STA serving as a first STA is provided. The station STA may include:
a first monitoring unit, configured to monitor an information packet, where the information packet carries first identification information, and the first identification information is used to identify a first directional transmit beam that is used by a second STA when the second STA sends the information packet;
a first determining unit, configured to determine whether the information packet is an information packet that is sent by the second STA to a third STA;
an obtaining unit, configured to obtain the first identification information if the first determining unit determines that the information packet is the information packet that is sent by the second STA to the third STA;

a second determining unit, configured to determine whether the first identification information matches preset second identification information; and a first processing unit, configured to: if the second determining unit determines that the first identification information matches the preset second identification information, determine that the first directional transmit beam matches a second directional transmit beam, and change a value of a counter that corresponds to a directional link between the first STA and the second STA, where the second directional transmit beam is a directional transmit beam determined by the second STA on the directional link through beam training, and the second identification information is used to identify the second directional transmit beam.

Beneficial effect of the method: after the first identification information carried in the information packet is intercepted and detected, whether the directional link between the first STA and the second STA is available is determined by using the first identification information and the preset second identification information. In a condition in which the first identification information matches the second identification information, the directional link is available. In addition, accuracy and timeliness of directional link availability determined by the first STA is improved by changing the value of the counter that corresponds to the directional link.

In at least some embodiments, the second determining unit is specifically configured to: determine, based on the first identification information, whether the first directional transmit beam is a narrow beam, and determine, based on the preset second identification information, whether the second directional transmit beam is a wide beam;

if the first directional transmit beam is a narrow beam and the second directional transmit beam is a wide beam, determine whether coverage of the first directional transmit beam falls within coverage of the second directional transmit beam; and if the coverage of the first directional transmit beam falls within the coverage of the second directional transmit beam, determine that the first identification information matches the preset second identification information.

Beneficial effect of this implementation: in at least some embodiments, provided that the coverage of the narrow beam falls within the coverage of the wide beam, it is considered that the first identification information matches the second identification information, and it may be further considered that the first directional transmit beam matches the second directional transmit beam.

In at least some embodiments, the first identification information includes: a number of the first directional transmit beam, a number of a codebook that is used to generate the first directional transmit beam, or an explicit information identifier used to generate the first directional transmit beam; and the second identification information includes: a number of the second directional transmit beam, a number of a codebook that is used to generate the second directional transmit beam, or an explicit information identifier used to generate the second directional transmit beam.

In at least some embodiments, the first identification information is carried by using a preamble part and/or a Media Access Control layer MAC header part of the information packet.

Beneficial effect of this implementation: the first identification information is carried by using the preamble part and/or the Media Access Control layer MAC header part of the information packet.

In at least some embodiments, the first identification information is carried by using the preamble part of the information packet is specifically: the first identification information is carried by using a header of a physical layer data unit in the preamble part of the information packet.

In at least some embodiments, the header of the physical layer data unit includes an EDMG Header-A and an EDMG Header-B, and if a transmission mode between the second STA and the first STA is a single-user transmission mode, the first identification information is carried by using the EDMG Header-A; or if a transmission mode between the second STA and the first STA is a multi-user transmission mode, the first identification information is carried by using the EDMG Header-A and/or the EDMG Header-B.

In at least some embodiments, the first identification information is carried by using the Media Access Control layer MAC header part of the information packet is specifically: the first identification information is carried by using a MAC protocol data unit in the MAC header part of the information packet.

In at least some embodiments, the MAC protocol data unit includes a QoS control field and an HT control field, and the first identification information is indicated by using the QoS control field or the HT control field.

In at least some embodiments, the first monitoring unit is specifically configured to monitor the information packet by using a directional receive beam, where the directional receive beam is a directional receive beam determined by the first STA on the directional link through beam training.

In at least some embodiments,
the station STA further includes:
a parsing unit, configured to: before whether the information packet is the information packet that is sent by the second STA to the third STA is determined, parse the header part of the information packet to obtain indication information, where
the first determining unit is specifically configured to: determine, based on the indication information, whether a source address of the information packet is the second STA, and determine whether a destination address of the information packet is the third STA; and
if the source address of the information packet is the second STA and the destination address of the information packet is the third STA, determine that the information packet is the information packet that is sent by the second STA to the third STA.

In at least some embodiments, the station STA further includes:
a trigger unit, configured to trigger a beam re-training procedure, if the value of the counter that corresponds to the directional link progressively decreases to zero or close to zero, or progressively increases to a preset threshold or close to a preset threshold, where the preset threshold is a preset value of the counter for triggering a beam re-training procedure;
a second monitoring unit, configured to monitor the information packet on the directional link; and
a second processing unit, configured to: before an execution time window for the beam re-training arrives, if the information packet that is sent by the second STA by using the directional link is monitored and received, change the value of the counter that corresponds to the directional link, and end the beam re-training procedure.

Beneficial effect of this implementation: unnecessary overheads caused by beam re-training are reduced, and system spectrum utilization is improved.

Compared with the prior art, the embodiments of the invention have the following advantages: After the first identification information carried in the information packet is intercepted and detected, whether the directional link between the first STA and the second STA is available is determined by using the first identification information and the preset second identification information. In a condition in which the first identification information matches the second identification information, the directional link is available. In addition, accuracy and timeliness of directional link availability determined by the first STA is improved by changing the value of the counter that corresponds to the directional link.

BRIEF DESCRIPTION OF DRAWINGS

To describe the technical solutions in the embodiments of the invention more clearly, the following briefly describes the accompanying drawings. Apparently, the accompanying drawings in the following description show merely some embodiments of the invention, and persons of ordinary skill in the art may still derive other drawings from these accompanying drawings.

FIG. 4 is a schematic diagram of a format of a physical layer data unit according to an embodiment of the invention;

FIG. 5 is a schematic diagram of a format of a MAC protocol data unit according to an embodiment of the invention;

FIG. 6 is a schematic diagram of using directional beams by a STA according to an embodiment of the invention;

FIG. 7 is a schematic diagram showing that coverage of a narrow beam falls within coverage of a wide beam according to an embodiment of the invention;

FIG. 8 is a schematic diagram of an embodiment of a beam re-training method according to the embodiments of the invention;

DESCRIPTION OF EMBODIMENTS

Embodiments of the invention provide a directional link maintenance method and a station STA, to improve accuracy and timeliness of directional link availability determined by the STA.

To make persons skilled in the art understand the technical solutions in embodiments of the invention better, the following clearly describes the technical solutions in the embodiments of the invention with reference to the accompanying drawings in the embodiments of the invention. Apparently, the described embodiments are merely some of but not all of the embodiments of the invention. Various modifications may be obtained by persons of ordinary skill in the art based on the embodiments of the invention without shall fall within the protection scope of the embodiments of the invention.

In the specification, claims, and accompanying drawings, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the invention described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those operations or units, but may include other operations or units not expressly listed or inherent to such a process, method, system, product, or device.

Figure 1:
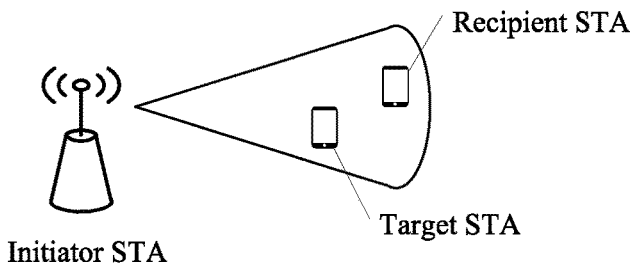
FIG. 1 is a schematic diagram of a working scene of a directional link maintenance method according to an embodiment of the invention.

In at least one embodiment, although STAs communicate with each other based on a directional link, there may be a plurality of STAs in coverage of a directional beam that is sent by a STA. Referring to FIG. 1, it is assumed that a single directional beam of an initiator STA can cover two STAs: a recipient STA and a target STA. Through beam training, the recipient STA and the target STA each set up a directional link with the initiator STA. For the initiator STA, the two directional links use a same directional transmit beam.

In a WLAN system, an information packet mainly includes three parts: preamble, a MAC header, and MAC payload. The preamble information and the MAC header can be parsed by all STAs.

Therefore, in at least some embodiments of the invention, a beam that may be used by each STA may be identified in advance, and the target STA may maintain a signal monitoring status on a directional link of the target STA. By intercepting an information packet that is sent by the initiator STA to the recipient STA, where preamble information and/or a MAC header of the information packet carries identification information, and the identification information is used to identify a directional transmit beam that is used by the initiator when the initiator sends the information packet, the target STA parses the preamble information and/or the MAC header to obtain the identification information, and determines whether the identification information matches identification information corresponding to a directional transmit beam determined by the initiator STA on a directional link between the target STA and the initiator STA through beam training. If the identification information matches the identification information corresponding to the directional transmit beam, it indicates that the directional transmit beams used by the initiator STA on two links match (or the directional transmit beams may be considered as the same in some cases). Then directional link maintenance is performed by changing a value of a counter that corresponds to the directional link between the target STA and the initiator STA.

A directional link maintenance method is described below with reference to specific embodiments.

Figure 2:
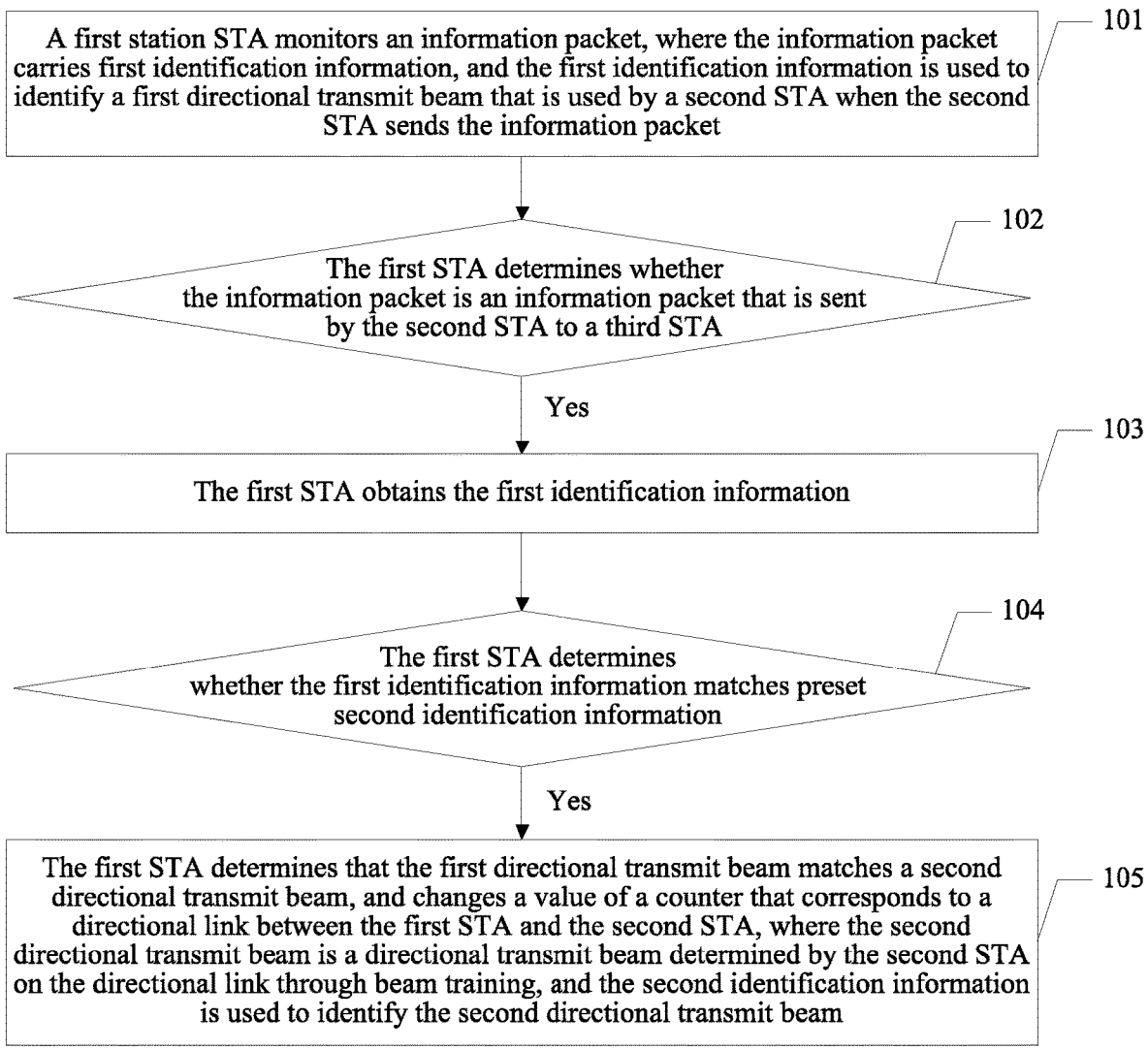
FIG. 2 is a schematic diagram of an embodiment of a directional link maintenance method according to the embodiments of the invention.

Referring to FIG. 2, an embodiment of the directional link maintenance method includes the following operations.

101. A first station STA monitors an information packet, where the information packet carries first identification information, and the first identification information is used to identify a first directional transmit beam that is used by a second STA when the second STA sends the information packet.

In this embodiment, the information packet may be a data packet, a management packet, or a control packet, or may be a special packet that carries control information. In a WLAN system, the information packet mainly includes three parts: preamble, a Media Access Control (MAC) layer header, and MAC payload. The preamble information and the MAC header can be parsed by all STAs.

It should be noted that the second STA may send the information packet to the first STA, or may send the information packet to another STA such as a third STA that is mentioned in the following description.

In some embodiments, the monitoring, by a first STA, an information packet is specifically:

monitoring, by the first STA, the information packet by using a directional receive beam, where the directional receive beam is a directional receive beam determined by the first STA on a directional link between the first STA and the second STA through beam training.

102. The first STA determines whether the information packet is an information packet that is sent by the second STA to a third STA, and performs operation 103 if the information packet is an information packet that is sent by the second STA to the third STA.

In this embodiment, the first STA may determine, by parsing the data packet, whether the information packet is the information packet that is sent by the second STA to the third STA; and perform operation 103 if the information packet is an information packet that is sent by the second STA to the third STA.

In some embodiments, before the determining, by the first STA, whether the information packet is an information packet that is sent by the second STA to a third STA, the method includes:

parsing, by the first STA, the header part of the information packet to obtain indication information; and the determining, by the first STA, whether the information packet is an information packet that is sent by the second STA to a third STA includes:

determining, by the first STA based on the indication information, whether a source address of the information packet is the second STA, and determining whether a destination address of the information packet is the third STA; and if the source address of the information packet is the second STA and the destination address of the information packet is the third STA, determining, by the first STA, that the information packet is the information packet that is sent by the second STA to the third STA.

103. The first STA obtains the first identification information.

In this embodiment, if the information packet is an information packet that is sent by the second STA to the third STA, the first STA obtains the first identification information.

104. The first STA determines whether the first identification information matches preset second identification information, and performs operation 105 if the first identification information matches the preset second identification information.

In this embodiment, the second identification information is used to identify a second directional transmit beam. The second directional transmit beam is a directional transmit beam determined by the second STA on the directional link between the first STA and the second STA through beam training. The system may preconfigure identification information for the second directional transmit beam, that is, the second identification information.

105. The first STA determines that the first directional transmit beam matches a second directional transmit beam, and changes a value of a counter that corresponds to a directional link between the first STA and the second STA, where the second directional transmit beam is a directional transmit beam determined by the second STA on the directional link through beam training, and the second identification information is used to identify the second directional transmit beam.

In this embodiment, the value of the counter may be changed to an initial value, or the value of the counter may be changed to a value between an initial value and an end value.

In this embodiment, after the first identification information carried in the information packet is intercepted and detected, whether the directional link between the first STA and the second STA is available is determined by using the first identification information and the preset second identification information. In a condition in which the first identification information matches the second identification information, the directional link is available. In addition, accuracy and timeliness of directional link availability determined by the first STA is improved by changing the value of the counter that corresponds to the directional link.

Figure 3:
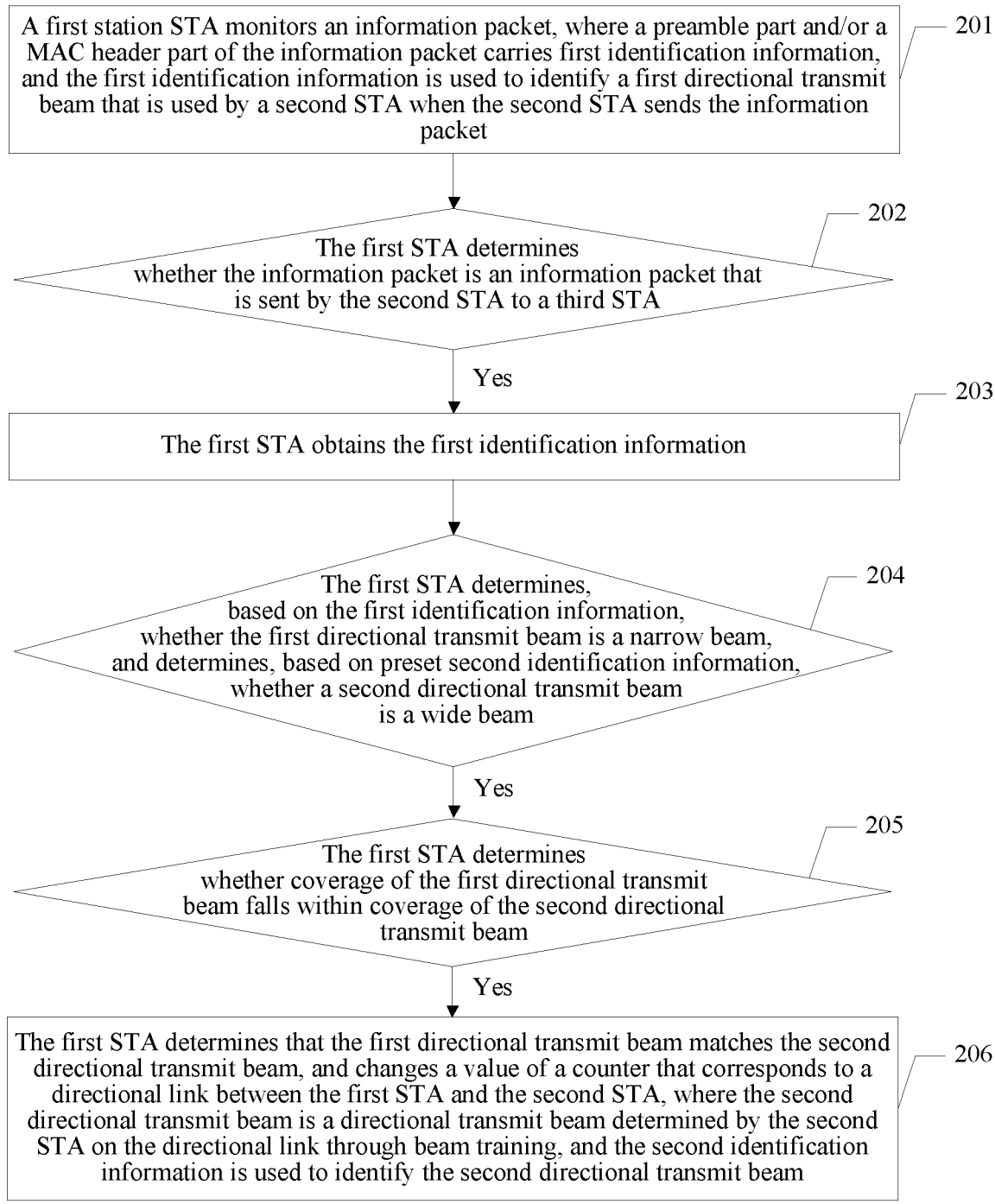
FIG. 3 is a schematic diagram of another embodiment of a directional link maintenance method according to the embodiments of the invention.

For ease of understanding, the directional link maintenance method according to at least one embodiment is described in detail below. Referring to FIG. 3, another embodiment of the directional link maintenance method includes the following operations.

201. A first station STA monitors an information packet, where a preamble part and/or a MAC header part of the information packet carries first identification information, and the first identification information is used to identify a first directional transmit beam that is used by a second STA when the second STA sends the information packet.

In this embodiment, that the preamble part of the information packet carries the first identification information may be specifically: a header part of a physical layer data unit in the preamble part of the information packet carries the first identification information. Similarly, it should be noted that, that the MAC header part of the information packet carries the first identification information may be specifically: a MAC protocol data unit in the MAC header part of the information packet carries the first identification information.

It should be noted that, for a format of the foregoing physical layer data unit, refer to FIG. 4. The header part of the physical layer data unit includes an EDMG Header-A and an EDMG Header-B. If a transmission mode between the second STA and the first STA is a single-user transmission beam, the first identification information is carried by using the EDMG Header-A; or if a transmission mode between the second STA and the first STA is a multi-user transmission mode, the first identification information is carried by using the EDMG Header-A or the EDMG Header-B. Preferably, the EDMG Header-A is selected to carry the first identification information. For a structure of the foregoing MAC protocol data unit, refer to FIG. 5. The MAC protocol data unit includes a QoS control field and an HT control field. The first identification information is indicated by using the QoS control field or the HT control field. For example, content indicated by using the QoS control field may be represented by using reserved bits: bits 10-14, as shown in Table 1. Certainly, embodiments of the invention are not limited to the foregoing carrying method, and another method may be used. Therefore, no limitation is imposed herein.

TABLE 1

| Suitable framework | Bits 0-3 | Bit 4 | Bits 5-6 | Bit 7 | Bit 8 | Bit 9 | Bits 10-14 | Bit 15 |
|---|---|---|---|---|---|---|---|---|
| QoS Data | TID | EOSP | Ack Policy | A-MSDU Present | A-MSDU Type | RDG/More PPDU | Reserved | AC Constraint |
| QoS Null | TID | EOSP | Ack Policy | Reserved | Reserved | RDG/More PPDU | Reserved | AC Constraint |

Before operation 201 in this embodiment, the second STA may send the information packet by using a directional transmit beam. The recipient of the information packet may be the first STA, or may be another STA such as a third STA in the following description. The directional transmit beam is a transmit beam determined, through beam training, by the second STA on a directional link between the second STA and a STA receiving the information packet.

202. The first STA determines whether the information packet is an information packet that is sent by the second STA to a third STA, and performs operation 203 if the information packet is an information packet that is sent by the second STA to the third STA.

203. The first STA obtains the first identification information.

In this embodiment, operation 202 is similar to operation 102, and operation 203 is similar to operation 103. Details are not described herein again.

204. The first STA determines, based on the first identification information, whether the first directional transmit beam is a narrow beam, and determines, based on preset second identification information, whether a second directional transmit beam is a wide beam; and performs operation 205 if the first directional transmit beam is a narrow beam and the second directional transmit beam is a wide beam.

In this embodiment, the second directional transmit beam is a directional transmit beam determined by the second STA on the directional link between the first STA and the second STA through beam training, and the second identification information is used to identify the second directional transmit beam.

It should be noted that the first identification information includes: a number of the first directional transmit beam, a number of a codebook that is used to generate the first directional transmit beam, or an explicit information identifier used to generate the first directional transmit beam; and similarly, the second identification information includes: a number of the second directional transmit beam, a number of a codebook that is used to generate the second directional transmit beam, or an explicit information identifier used to generate the second directional transmit beam. In at least some embodiments, three identification methods for a directional transmit beam are provided: 1. Each STA numbers all beams that may be used by the STA, for example, beamID/sector=0, 1, . . . , representing directional transmit beams of different space orientations and beam widths. 2. Each STA numbers codebooks that may be used by the STA to generate a directional transmit beam, for example, antenna weight vector (AWV) identifiers (one codeword corresponds to a particular directional transmit beam). 3. An explicit information identifier used for generating a directional transmit beam, for example, a transfer codeword. In at least some embodiments, a schematic diagram of directional transmit beams used by a STA is provided. Referring to FIG. 6, a number of each directional transmit beam in FIG. 6 represents a coverage direction and a beam width. FIG. 6 shows a second STA 1, six sectors 2a, 2b, 2c, 2d, 3e and 2f associated with the second STA 1, an MS (first STA) 3 and a beam 4 of the first STA. Each sector, for example a sector 0 can comprise 4 beams, for example beams 5a, 5b, 5c and 5d). Each beam has a coverage direction and a beam width.

It may be understood that, because a number of a directional transmit beam may represent a coverage direction and a width, when the first identification information is specifically a number, the coverage direction and the width of the directional transmit beam may be determined by using the number.

205. The first STA determines whether coverage of the first directional transmit beam falls within coverage of the second directional transmit beam; and performs operation 206 if the coverage of the first directional transmit beam falls within the coverage of the second directional transmit beam.

In this embodiment, referring to FIG. 7, provided that the coverage of the narrow beam falls within the coverage of the wide beam (in a horizontal angle domain and a pitch angle domain), the first STA determines that the first directional transmit beam matches the second directional transmit beam.

206. The first STA determines that the first directional transmit beam matches the second directional transmit beam, and changes a value of a counter that corresponds to a directional link between the first STA and the second STA, where the second directional transmit beam is a directional transmit beam determined by the second STA on the directional link through beam training, and the second identification information is used to identify the second directional transmit beam.

In this embodiment, the value of the counter may be changed to an initial value, or the value of the counter may be changed to a value between an initial value and an end value.

In this embodiment, after the first identification information carried in the information packet is intercepted and detected, whether the directional link between the first STA and the second STA is available is determined by using the first identification information and the preset second identification information. In a condition in which the first identification information matches the second identification information, the directional link is available. In addition, accuracy and timeliness of directional link availability determined by the first STA is improved by changing the value of the counter that corresponds to the directional link.

In some embodiments, a new beam re-training method is provided. For details, refer to FIG. 8, and an embodiment of the beam re-training method that includes the following operations.

301. A first STA triggers a beam re-training procedure if a value of a counter that corresponds to a directional link progressively decreases to zero or close to zero, or progressively increases to a preset threshold or close to a preset threshold, where the directional link is a directional link between the first STA and a second STA, and the preset threshold is a preset value of the counter for triggering a beam re-training procedure.

In this embodiment, the preset threshold may be zero, or may be another value, and no limitation is imposed herein.

302. The first STA monitors an information packet on the directional link.

In this embodiment, the first STA monitors the information packet by using a directional receive beam, and the directional receive beam is a directional receive beam determined by the first STA on the directional link through beam training.

303. Before an execution time window for the beam re-training arrives, if the first STA monitors and receives the information packet that is sent by the second STA by using the directional link, the first STA changes the value of the counter that corresponds to the directional link, and ends the beam re-training procedure.

In this embodiment, the information packet may be a data packet, a management packet, or a control packet, or may be a special packet that carries control information.

A destination object of the information packet may be the first STA, or may be another STA.

The first STA changes the value of the counter that corresponds to the directional link, and the changed value may be an initial value or may be a value between an initial value and an end value.

In this embodiment, based on the foregoing new beam re-training method, unnecessary overheads caused by beam re-training are reduced, and system spectrum utilization is improved.

Figure 9:
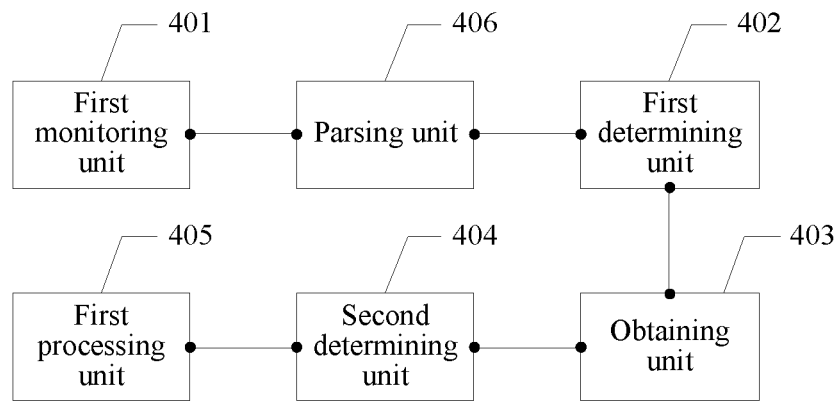
FIG. 9 is a schematic diagram of an embodiment of a station STA according to the embodiments of the invention.

The following describes a station STA according to at least one embodiment. The station STA serves as a first STA. Referring to FIG. 9, an embodiment of the station STA includes:

a first monitoring unit 401, configured to monitor an information packet, where the information packet carries first identification information, and the first identification information is used to identify a first directional transmit beam that is used by a second STA when the second STA sends the information packet;

a first determining unit 402, configured to determine whether the information packet is an information packet that is sent by the second STA to a third STA;

an obtaining unit 403, configured to obtain the first identification information if the first determining unit 402 determines that the information packet is the information packet that is sent by the second STA to the third STA;

a second determining unit 404, configured to determine whether the first identification information matches preset second identification information; and a first processing unit 405, configured to: if the second determining unit 404 determines that the first identification information matches the preset second identification information, determine that the first directional transmit beam matches a second directional transmit beam, and change a value of a counter that corresponds to a directional link between the first STA and the second STA, where the second directional transmit beam is a directional transmit beam determined by the second STA on the directional link through beam training, and the second identification information is used to identify the second directional transmit beam.

In this embodiment, after the first identification information carried in the information packet is intercepted and detected, whether the directional link between the first STA and the second STA is available is determined by using the first identification information and the preset second identification information. In a condition in which the first identification information matches the second identification information, the directional link is available. In addition, accuracy and timeliness of directional link availability determined by the first STA is improved by changing the value of the counter that corresponds to the directional link.

Optionally, the first monitoring unit 401 is specifically configured to monitor the information packet by using a directional receive beam, where the directional receive beam is a directional receive beam determined by the first STA on the directional link through beam training.

Optionally, the station STA further includes:

a parsing unit 406, configured to: before whether the information packet is the information packet that is sent by the second STA to the third STA is determined, parse the header part of the information packet to obtain indication information; and the first determining unit 402 is specifically configured to determine, based on the indication information, whether a source address of the information packet is the second STA, and determine whether a destination address of the information packet is the third STA; and if the source address of the information packet is the second STA and the destination address of the information packet is the third STA, determine that the information packet is the information packet that is sent by the second STA to the third STA.

Figure 10:
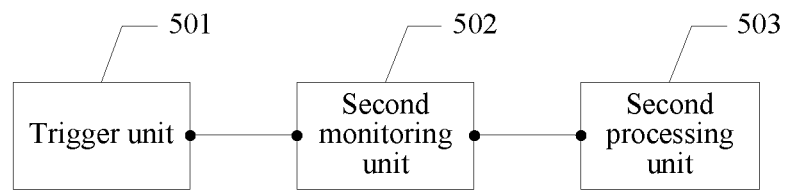
FIG. 10 is a schematic diagram of another embodiment of a station STA according to the embodiments of the invention.

Referring to FIG. 10, another embodiment of the station STA includes:

a trigger unit 501, configured to trigger a beam re-training procedure, if the value of the counter that corresponds to the directional link progressively decreases to zero or close to zero, or progressively increases to a preset threshold or close to a preset threshold, where the preset threshold is a preset value of the counter for triggering a beam re-training procedure;

a second monitoring unit 502, configured to monitor the information packet on the directional link; and a second processing unit 503, configured to: before an execution time window for the beam re-training arrives, if the information packet that is sent by the second STA by using the directional link is monitored and received, change the value of the counter that corresponds to the directional link, and end the beam re-training procedure.

Obviously, based on this embodiment, unnecessary overheads caused by beam re-training can be reduced, and system spectrum utilization is improved.

Figure 11:
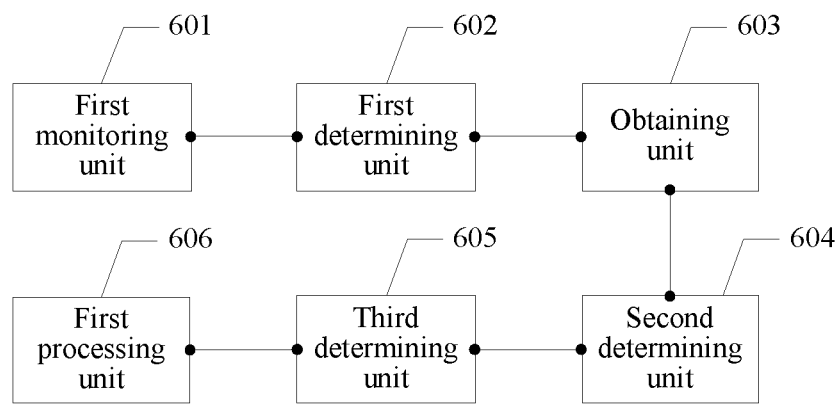
FIG. 11 is a schematic diagram of another embodiment of a station STA according to the embodiments of the invention.

Referring to FIG. 11, another embodiment of the station STA includes:

a first monitoring unit 601, configured to monitor an information packet, where a preamble part and/or a MAC header part of the information packet carries first identification information, and the first identification information is used to identify a first directional transmit beam that is used by a second STA when the second STA sends the information packet;

a first determining unit 602, configured to determine whether the information packet is an information packet that is sent by the second STA to a third STA;

an obtaining unit 603, configured to obtain the first identification information if the first determining unit 602 determines that the information packet is the information packet that is sent by the second STA to the third STA;

a second determining unit 604, configured to: determine, based on the first identification information, whether the first directional transmit beam is a narrow beam, and determine, based on the preset second identification information, whether the second directional transmit beam is a wide beam;

a third determining unit 605, configured to: if the first directional transmit beam is a narrow beam and the second directional transmit beam is a wide beam, determine whether coverage of the first directional transmit beam falls within coverage of the second directional transmit beam;

a first processing unit 606, configured to: if the third determining unit 605 determines that the coverage of the first directional transmit beam falls within the coverage of the second directional transmit beam, determine that the first directional transmit beam matches the second directional transmit beam, and change a value of a counter that corresponds to a directional link between the first STA and the second STA, where the second directional transmit beam is a directional transmit beam determined by the second STA on the directional link through beam training, and the second identification information is used to identify the second directional transmit beam.

The first identification information includes: a number of the first directional transmit beam, a number of a codebook that is used to generate the first directional transmit beam, or an explicit information identifier used to generate the first directional transmit beam; and the second identification information includes: a number of the second directional transmit beam, a number of a codebook that is used to generate the second directional transmit beam, or an explicit information identifier used to generate the second directional transmit beam.

The first identification information is carried by using a preamble part and/or a Media Access Control layer MAC header part of the information packet.

That the first identification information is carried by using the preamble part of the information packet is specifically: the first identification information is carried by using a header of a physical layer data unit in the preamble part of the information packet.

The header of the physical layer data unit includes an EDMG Header-A and an EDMG Header-B, and if a transmission mode between the second STA and the first STA is a single-user transmission mode, the first identification information is carried by using the EDMG Header-A; or if a transmission mode between the second STA and the first STA is a multi-user transmission mode, the first identification information is carried by using the EDMG Header-A and/or the EDMG Header-B.

That the first identification information is carried by using the Media Access Control layer MAC header part of the information packet is specifically: the first identification information is carried by using a MAC protocol data unit in the MAC header part of the information packet.

The MAC protocol data unit includes a QoS control field and an HT control field, and the first identification information is indicated by using the QoS control field or the HT control field.

Figure 12:
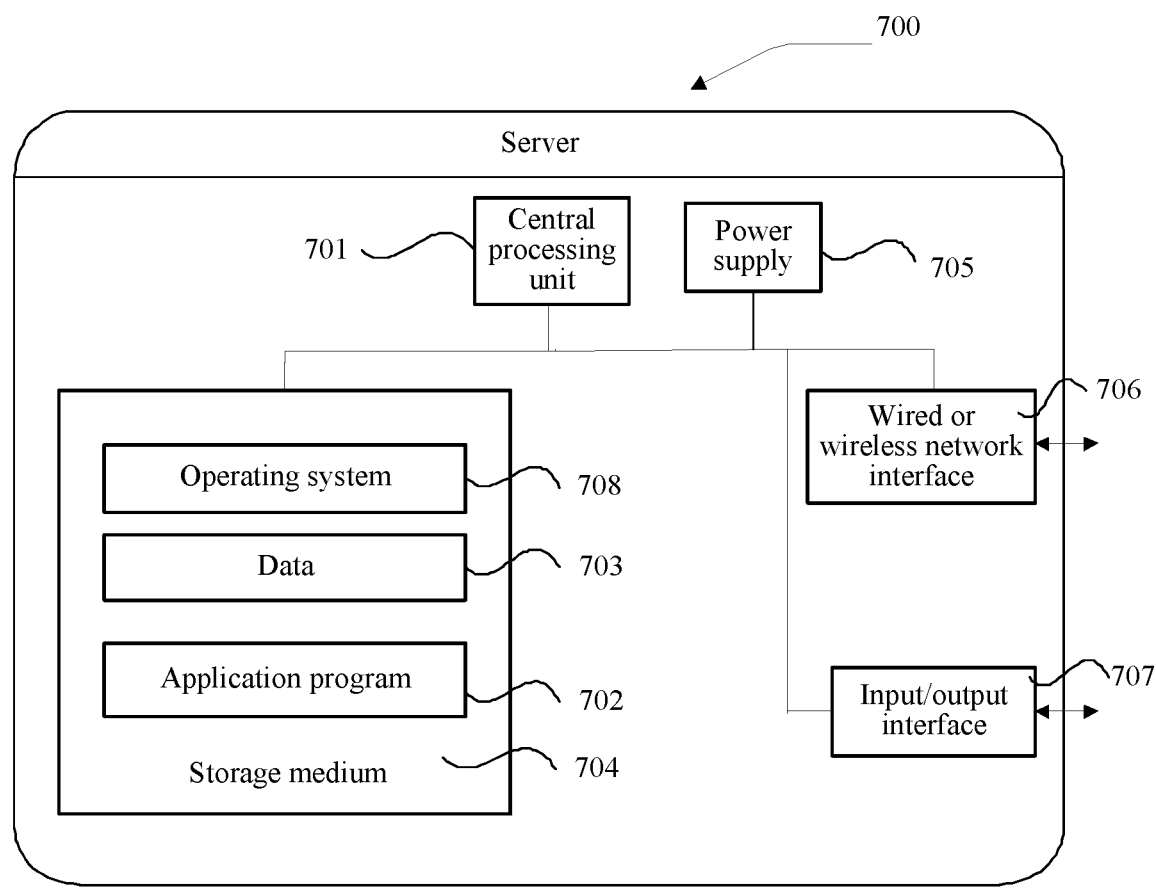
FIG. 12 is a schematic diagram of an embodiment of a structure of a server according to the embodiments of the invention.

In at least some embodiments, a server is provided. Referring to FIG. 12, an embodiment of the server includes the following components:

FIG. 12 is a schematic structural diagram of the server according to one embodiment. The server 700 may differ greatly due to different configurations or performance, and may include one or more central processing units (CPU) 701 (for example, one or more processors), and one or more storage mediums 704 (for example, one or more mass storage devices) that store an application program 702 or data 703. The memory 704 may be a transient or persistent memory. The program stored in the storage medium 704 may include one or more modules (not shown in the figure), and each module may include a series of instruction operations in a CPU. Furthermore, the central processing unit 701 may be configured to communicate with the storage medium 704, and perform, on the server 700, the series of instruction operations in the storage medium 704.

The server 700 may further include one or more power supplies 705, one or more wired or wireless network interfaces 706, one or more input/output interfaces 707, and/or one or more operating systems 708, for example, Windows Server™, Mac OS X™, Unix™, Linux™, or FreeBSD™.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In at least some embodiments, functional units may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, at least some embodiments of the invention may be implemented in the form of a software product. The software product is stored in a storage medium and includes several instructions for instructing a computer device (which may be a personal computer, a server, or a network device) to perform all or some of the operations of the methods as described according to at least some embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely intended for illustrating some embodiments of the invention, but not for limiting the their protection scope. Although embodiments of the invention is described in detail with reference to the foregoing embodiments, persons of ordinary skill in the art should understand that they may still make modifications to the foregoing embodiments or make equivalent replacements to some technical features thereof, without departing from the scope of the embodiments of the invention.

What is claimed is:

1. A directional link maintenance method, comprising:
monitoring, by a first station (STA), an information packet, wherein the information packet carries first identification information, and the first identification information is used to identify a first directional transmit beam that is used by a second STA when the second STA sends the information packet;
determining, by the first STA, whether the information packet is sent by the second STA to a third STA, and obtaining the first identification information if the information packet is sent by the second STA to the third STA; and
determining, by the first STA, whether the first identification information matches preset second identification information, and if the first identification information matches the preset second identification information, determining, by the first STA, that the first directional transmit beam matches a second directional transmit beam, and changing a value of a counter that corresponds to a directional link between the first STA and the second STA, wherein the second directional transmit beam is determined by the second STA on the directional link through beam training, and the second identification information is used to identify the second directional transmit beam.

2. The method according to claim 1, wherein the determining, by the first STA, whether the first identification information matches preset second identification information comprises:
determining, by the first STA based on the first identification information, whether the first directional transmit beam is a narrow beam, and determining, based on the preset second identification information, whether the second directional transmit beam is a wide beam;
if the first directional transmit beam is the narrow beam and the second directional transmit beam is the wide beam, determining whether coverage of the first directional transmit beam falls within coverage of the second directional transmit beam; and
if the coverage of the first directional transmit beam falls within the coverage of the second directional transmit beam, determining, by the first STA, that the first identification information matches the preset second identification information.

3. The method according to claim 1, wherein the first identification information comprises: a number of the first directional transmit beam, a number of a codebook that is used to generate the first directional transmit beam, or an explicit information identifier used to generate the first directional transmit beam; and the second identification information comprises: a number of the second directional transmit beam, a number of a codebook that is used to generate the second directional transmit beam, or an explicit information identifier used to generate the second directional transmit beam.

4. The method according to claim 3, wherein the first identification information is carried by using a preamble part of the information packet, a Media Access Control layer (MAC) header part of the information packet, or both the preamble part of the information packet and the MAC header part of the information packet.

5. The method according to claim 4, wherein the first identification information that is carried by using the preamble part of the information packet is the first identification information that is carried by using a header of a physical layer data unit in the preamble part of the information packet.

6. The method according to claim 5, wherein the header of the physical layer data unit comprises an EDMG Header-A and an EDMG Header-B, and if a transmission mode between the second STA and the first STA is a single-user transmission mode, the first identification information is carried by using the EDMG Header-A; or if the transmission mode between the second STA and the first STA is a multi-user transmission mode, the first identification information is carried by using the EDMG Header-A, the EDMG Header-B, or the EDMG Header-A and the EDMG Header-B.

7. The method according to claim 4, wherein the first identification information is carried by using the MAC header part of the information packet is the first identification information that is carried by using a MAC protocol data unit in the MAC header part of the information packet.

8. The method according to claim 7, wherein the MAC protocol data unit comprises a QoS control field and an HT control field, and the first identification information is indicated by using the QoS control field or the HT control field.

9. The method according to claim 1, wherein the monitoring, by the first station STA, the information packet comprises:
monitoring, by the first STA, the information packet by using a directional receive beam, wherein the directional receive beam is determined by the first STA on the directional link through beam training.

10. The method according to claim 1, further comprising:
before the determining, by the first STA, whether the information packet is sent by the second STA to the third STA
parsing, by the first STA, a header part of the information packet to obtain indication information; and
wherein the determining, by the first STA, whether the information packet is sent by the second STA to the third STA comprises:
determining, by the first STA based on the indication information, whether a source address of the information packet is the second STA, and determining whether a destination address of the information packet is the third STA; and
if the source address of the information packet is the second STA and the destination address of the information packet is the third STA, determining, by the first STA, that the information packet is sent by the second STA to the third STA.

11. The method according to claim 1, wherein the method further comprises:
triggering, by the first STA, a beam re-training procedure, if the value of the counter that corresponds to the directional link progressively decreases to zero or close to zero, or progressively increases to a preset threshold or close to the preset threshold, wherein the preset threshold is a preset value of the counter for triggering the beam re-training procedure;
monitoring, by the first STA, the information packet on the directional link; and
before an execution time window for the beam re-training arrives, if the first STA monitors and receives the information packet that is sent by the second STA by using the directional link, changing, by the first STA, the value of the counter that corresponds to the directional link, and ending the beam re-training procedure.

12. A station (STA), serving as a first STA and comprising:
a processor, configured to monitor an information packet, wherein the information packet carries first identification information, and the first identification information is used to identify a first directional transmit beam that is used by a second STA when the second STA sends the information packet;
determine whether the information packet is sent by the second STA to a third STA;
obtain the first identification information if the information packet is sent by the second STA to the third STA;
determine whether the first identification information matches preset second identification information; and
if the first identification information matches the preset second identification information, determine that the first directional transmit beam matches a second directional transmit beam, and change a value of a counter that corresponds to a directional link between the first STA and the second STA, wherein the second directional transmit beam is determined by the second STA on the directional link through beam training, and the second identification information is used to identify the second directional transmit beam.

13. The STA according to claim 12, wherein the processor is further configured to: determine, based on the first identification information, whether the first directional transmit beam is a narrow beam, and determine, based on the preset second identification information, whether the second directional transmit beam is a wide beam;
if the first directional transmit beam is the narrow beam and the second directional transmit beam is the wide beam, determine whether coverage of the first directional transmit beam falls within coverage of the second directional transmit beam; and
if the coverage of the first directional transmit beam falls within the coverage of the second directional transmit beam, determine that the first identification information matches the preset second identification information.

14. The STA according to claim 12, wherein the first identification information comprises: a number of the first directional transmit beam, a number of a codebook that is used to generate the first directional transmit beam, or an explicit information identifier used to generate the first directional transmit beam; and the second identification information comprises: a number of the second directional transmit beam, a number of a codebook that is used to generate the second directional transmit beam, or an explicit information identifier used to generate the second directional transmit beam.

15. The STA according to claim 14, wherein the first identification information is carried by using a preamble part of the information packet, a Media Access Control layer (MAC) header part of the information packet, or both the preamble part of the information packet and the MAC header part of the information packet.

16. The STA according to claim 15, wherein the first identification information that is carried by using the preamble part of the information packet is the first identification information that is carried by using a header of a physical layer data unit in the preamble part of the information packet.

17. The STA according to claim 15, wherein the first identification information that is carried by using the MAC header part of the information packet is the first identification information that is carried by using a MAC protocol data unit in the MAC header part of the information packet.

18. The STA according to claim 12, wherein the processor is further configured to monitor the information packet by using a directional receive beam, wherein the directional receive beam is determined by the first STA on the directional link through beam training.

19. The STA according to claim 12, wherein the processor is further configured to:
before determining whether the information packet is sent by the second STA to the third STA, parse the header part of the information packet to obtain indication information; and
based on the indication information, determine whether a source address of the information packet is the second STA, and determine whether a destination address of the information packet is the third STA; and
if the source address of the information packet is the second STA and the destination address of the information packet is the third STA, the processor is further configured to determine that the information packet is sent by the second STA to the third STA.

20. The STA according to claim 12, wherein the processor is further configured to:
trigger a beam re-training procedure, if the value of the counter that corresponds to the directional link progressively decreases to zero or close to zero, or progressively increases to a preset threshold or close to the preset threshold, wherein the preset threshold is a preset value of the counter for triggering the beam re-training procedure;
wherein the processor is further configured to monitor the information packet on the directional link; and
before an execution time window for the beam re-training arrives, if the information packet that is sent by the second STA by using the directional link is monitored and received, the processor is further configured to change the value of the counter that corresponds to the directional link, and end the beam re-training procedure.

* * * * *